United States Patent Office 3,039,991
Patented June 19, 1962

3,039,991
PREPARATION OF FLAME-RESISTANT STYRENE POLYMER IN THE PRESENCE OF A CHLORINATED ETHYLENICALLY UNSATURATED COMPOUND AND A BROMINATED ESTER OF PHOSPHORIC ACID
Alfred Cooper, Croydon, England, assignor to Expanded Rubber Company Limited, Croydon, England
No Drawing. Filed Oct. 28, 1959, Ser. No. 849,158
Claims priority, application Great Britain Nov. 7, 1958
6 Claims. (Cl. 260—45.5)

This invention relates to flame-proofing polymeric materials more particularly for the purpose of providing an expanded thermoplastic resin with flame-proof properties.

By "flame-proof" as used in this specification is meant a degree of non-inflammability such that when a flame is held beneath the material, though it may burn, as soon as the flame is removed from it combustion will cease.

Polymers which come mainly into consideration for the purpose of the present invention are the more inflammable materials which are used for making films, sheets and moulded articles such as polystyrene, poly-alpha-methyl styrene, polymethyl styrene and copolymers of styrene with other monomers such as acrylonitrile and methyl methacrylate, polymethyl methacrylate, but other comparatively flame-resistant polymers such as polyvinyl chloride can be usefully treated by the process of the present invention. It is well known that with the exception of polyvinyl chloride these polymers are highly inflammable, more especially when converted into expanded or foamed bodies owing to the flame-promoting presence of air in the cells of the expanded materials.

Among the materials which have been proposed for conferring flame-resistant properties, hereinafter called the "flame-proofer," special emphasis was laid on the liquid halogenated ethylenically unsaturated hydrocarbons, in particular vinylidene chloride and halogenated alkyl and aryl esters of phosphoric acid and proportions of up to 30% of the weight of the polymer were mentioned.

It is an object of the present invention to produce an improved flame-proof polymer by mixing the monomers or partly polymerised but still liquid materials with a polymerising catalyst and carrying out the polymerisation in bulk, solution, suspension or emulsion form in known manner.

It is also an object of the invention to produce an expanded flame-proof material by mixing the monomers or partly polymerised liquid with a liquid or solid blowing agent and polymerising the mixture.

It has now been found quite unexpectedly that considerable advantages are obtained if mixtures of a halogenated ethylenically unsaturated compound and a halogenated ester of phosphoric acid are used as the flame-proofing agent instead of either material alone. If vinylidene chloride is used alone a relatively high proportion is needed to give the necessary self-extinguishing properties and on the other hand if brominated tricresyl phosphate were used by itself in sufficient quantity to give the necessary self-extinguishing properties the softening point of the product would be lowered too much and, in particular, for the purpose of making a gas-expanded material, the gas-retaining properties during expansion would be lowered to too great an extent for the cellular formation to be retained.

Furthermore it has been found advantageous to combine with the other two flame-proofing components a small amount up to 5% by weight of the mix of antimony trioxide which has the effect of promoting the liberation of the halogen which enables the same flame-proofing effect to be attained with less halogenated phosphoric acid ester and the reduction of the non-polymerisable constituent has a strengthening effect on the final product. This is important in making cellular material because the strengthening of the cell walls makes it possible to obtain a more expanded material, i.e. to obtain a light density and in this way materials having a density of the order of 1 to 1.2 lbs. per cubic foot have been obtained.

The halogenated ethylenically unsaturated compound is preferably in the monomeric form but it may be partly or wholly polymerised and used if necessary with the aid of a solvent or plasticiser.

According to the present invention therefore a process for the production of a flame-resistant polymeric material comprises incorporating with the said material while it is still insufficiently polymerised to form a wholly solid polymer, a minor proportion of a mixture consisting of a halogenated ethylenically unsaturated compound and a halogenated ester of phosphoric acid and submitting the mixture to polymerisation until a solid polymer is formed.

An important feature of the invention is the inclusion in the polymerisable mixture of a proportion up to 5% thereof of antimony trioxide.

According to a preferred feature of the invention the polymerisable mixture for forming the flame-proofed polymer contains 1–10 parts by weight of the halogenated ethylenically unsaturated compound and 0.1 to 4 parts by weight of the halogenated ester of phosphoric acid and 1 to 5 parts by weight of antimony trioxide in a total of 100 parts by weight of the polymerisable mixture.

The invention is particularly applicable to the production of a flame-proof polystyrene.

For the purpose of this invention the monomeric or polymeric halogenated ethylenically unsaturated compound may be vinylidene chloride, polyvinyl chloride or chloroprene and the halogenated ester of phosphoric acid an aryl or alkyl ester such as brominated phenyl phosphate, brominated cresyl phosphate, brominated xylene phosphate, or tris (2,3 dibromo propyl) phosphate. Furthermore a high degree of bromination of the phosphoric ester is desirable and a product containing 40–70% bromine has been found satisfactory.

The following examples exemplify the method of producing an expanded flame-resistant plastic in accordance with our invention.

*Example 1*

340 parts by weight of polystyrene moulding powder are mixed with 500 parts by weight of styrene monomer with stirring for two hours in a suitable mixing vessel, until a homogeneous solution is obtained. 15 parts by weight of brominated tricresyl phosphate are added followed by 20 parts by weight of antimony trioxide, 10 parts by weight of dry benzoyl peroxide, 65 parts by weight of petroleum ether with a boiling range of 40 to 60° C. and 40 parts by weight of vinylidene chloride. The polymerisation is carried out by heating the mixture in a hermetically sealed container for 72 hours at 47° C. followed by 24 hours at 67° C. The polymerised solid is broken down into discrete particles resembling moulding powder. This powder is pre-expanded in steam or boiling water in 2 to 3 minutes giving a very light bulk density of below 3 lbs./ft.$^3$. Such pre-expanded granules are placed in a mould which is completely filled and placed in boiling water for 10 minutes, cooled in air or cold water until the temperature of the moulding falls below 30° C.

*Example 2*

278 parts by weight of polystyrene moulding powder are mixed with 567 parts by weight of styrene monomer with stirring for two hours in a suitable mixing vessel, until a homogeneous solution is obtained. 15 parts by weight of brominated tri-xylenyl phosphate are added followed by 20 parts by weight of antimony trioxide, 10 parts by weight of dry benzoyl peroxide, 65 parts by weight of petroleum ether with a boiling range of 40 to 60° C., and 40 parts by weight of vinylidene chloride. The polymerisation and method of producing a moulded article are as in Example 1. A moulding produced from this material has good flame-proofing properties.

*Example 3*

15 parts by weight of brominated tri-phenyl phosphate are substituted for the same quantity by weight of brominated tri-xylenyl phosphate in the formulation described in Example 2, and a moulding is prepared from the polymerised material in a similar manner. The moulding has good flame-proofing properties.

*Example 4*

288 parts by weight of polystyrene moulding powder are mixed with 527 parts by weight of styrene monomer followed by the addition of 80 parts by weight of a dispersion of 40 parts by weight of polyvinyl chloride and 40 parts by weight of styrene monomer, 10 parts by weight of benzoyl peroxide, 20 parts by weight of antimony trioxide, 15 parts by weight of brominated tri-cresyl phosphate and 60 parts by weight of petroleum ether of boiling range 40 to 60° C. The mixture is polymerised in a suitable mixing vessel by heating at 47° C. for 90 hours followed by a heating period of 24 hours at 67° C. The polymerised solid is crushed into small particles approximately $\frac{1}{16}$ to $\frac{1}{4}$ inch long which are pre-expanded in steam at 100° C. for two minutes. The pre-expanded particles are placed in a 6" x 6" x 1" frame mould which is immersed in boiling water for ten minutes cooled in air or cold water until the temperature of the moulding falls below 30° C.

*Example 5*

25 parts by weight of chloroprene rubber and 270 parts by weight of polystyrene are dissolved in 575 parts by weight of styrene monomer, and this is followed by the addition of 15 parts by weight of brominated tri-cresyl phosphate, 30 parts by weight of antimony trioxide, 25 parts by weight of dry benzoyl peroxide and 60 parts by weight of petroleum ether of boiling range 40 to 60° C. The mixture was heated for 90 hours at 47° C. followed by 24 hours at 67° C. A moulding was prepared from the polymerised material as described in the previous examples.

*Example 6*

300 parts by weight of polystyrene moulding powder are mixed with 500 parts by weight of styrene monomer until a homogeneous solution is obtained. 15 parts by weight of tris (2,3 dibromo propyl) phosphate are added followed by 25 parts by weight of antimony trioxide, 10 parts by weight of dry benzoyl peroxide, 60 parts by weight of petroleum ether with a boiling range of 40 to 60° C., and 40 parts by weight of vinylidene chloride. The composition was heated for 80 hours at 47° C. followed by 24 hours at 67° C. A moulding was prepared from the polymerised material in the manner described in Example 1 with good flame-proofing properties.

I claim:
1. A process for the production of a flame-resistant polymeric material, which comprises polymerising in the presence of a polymerisation catalyst a liquid mixture containing:
 (a) a substance selected from the group consisting of monomeric and partially polymerised styrene and methyl substituted styrenes and copolymers of styrene with acrylonitrile and methyl methacrylate;
 (b) a substance selected from the group consisting of monomeric and partially polymerised vinylidene chloride, monomeric and partially polymerised vinyl chloride and chloroprene;
 (c) a substance selected from the group consisting of brominated alkyl and aryl esters of phosphoric acid.
2. A process as claimed in claim 1, wherein the mixture to be polymerised also includes up to 5% by weight of the polymerisable ingredients of antimony trioxide.
3. A process as claimed in claim 1, wherein the brominated ester of phosphoric acid contains 40–70% of bromine.
4. A process for the production of a flame-resistant polymeric material, which comprises submitting to polymerisation in the presence of a polymerisation catalyst a mixture consisting of a solution of polystyrene in styrene monomer, vinylidene chloride and brominated tricresyl phosphate containing 40–70% bromine.
5. A process for the production of a flame-resistant polymeric material, which comprises submitting to polymerisation in the presence of benzoyl peroxide, a mixture consisting of a solution of polystyrene in styrene monomer, 1–10 parts by weight of vinylidene chloride, 0.1–4 parts by weight of brominated tricresyl phosphate containing 40–70% bromine and 1–5 parts by weight of antimony trioxide, in a total of 100 parts by weight of the polymerisable mixture.
6. A process for the production of a flame-resistant polymeric material, which comprises incorporating with a homogeneous solution of polystyrene in styrene monomer a minor proportion of a mixture consisting of vinylidene chloride and brominated tri-cresyl phosphate containing 40–70% bromine and polymerising the mixture.

References Cited in the file of this patent
UNITED STATES PATENTS

| | | |
|---|---|---|
| 2,536,988 | Vartanian | Jan. 2, 1951 |
| 2,660,543 | Walter et al. | Nov. 24, 1953 |
| 2,676,927 | McCurdy et al. | Apr. 27, 1954 |
| 2,717,216 | Arone | Sept. 6, 1955 |
| 2,909,501 | Robitschek | Oct. 20, 1959 |

FOREIGN PATENTS

| | | |
|---|---|---|
| 1,168,662 | France | Dec. 12, 1958 |

OTHER REFERENCES

"Rubber and Plastics Age," March 1956, pages 169–172, Skinner et al.